United States Patent
Shimabukuro et al.

(10) Patent No.: US 8,317,607 B2
(45) Date of Patent: Nov. 27, 2012

(54) WAGERING GAME MACHINE DIGITALLY SIGNED VOLUME MANAGEMENT

(75) Inventors: Jorge Luis Shimabukuro, Las Vegas, NV (US); Anussorn Andy Veradej, Las Vegas, NV (US); Jun Wang, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 424 days.

(21) Appl. No.: 12/594,740

(22) PCT Filed: Mar. 31, 2008

(86) PCT No.: PCT/US2008/004173
§ 371 (c)(1),
(2), (4) Date: Oct. 5, 2009

(87) PCT Pub. No.: WO2008/123959
PCT Pub. Date: Oct. 16, 2008

(65) Prior Publication Data
US 2010/0120529 A1    May 13, 2010

Related U.S. Application Data

(60) Provisional application No. 60/910,078, filed on Apr. 4, 2007.

(51) Int. Cl.
*A63F 13/00* (2006.01)

(52) U.S. Cl. ................................................ 463/29
(58) Field of Classification Search ............... 463/29
See application file for complete search history.

(56) References Cited

U.S. PATENT DOCUMENTS

| 6,149,522 | A | 11/2000 | Alcorn et al. |
| 2004/0162989 | A1 | 8/2004 | Kirovski |
| 2006/0155922 | A1* | 7/2006 | Gorobets et al. ............ 711/103 |
| 2007/0015590 | A1* | 1/2007 | Jackson et al. .................. 463/43 |

OTHER PUBLICATIONS

"International Application Serial No. PCT/US2008/004173, Written Opinion mailed Jun. 26, 2008", 6 pgs.
"International Application Serial No. PCT/US2008/004173, Search Report mailed Jun. 26, 2008", 4 pgs.

\* cited by examiner

*Primary Examiner* — Peter DungBa Vo
*Assistant Examiner* — Jeffrey Wong
(74) *Attorney, Agent, or Firm* — Schwegman Lundberg & Woessner, P.A.

(57) ABSTRACT

A computerized wagering game system includes a gaming module comprising gaming code which is operable to present a wagering game on which monetary value can be wagered; and an authentication module. The authentication module is operable to authenticate one or more used partitions of a non-volatile storage volume using a first authentication method and to authenticate one or more unused sections of the nonvolatile storage volume using a second authentication method.

19 Claims, 6 Drawing Sheets

WAGERING GAME MACHINE DIGITALLY SIGNED VOLUME MANAGEMENT

RELATED APPLICATION

This application is a U.S. National Stage Filing under 35 U.S.C. 371 from International Patent Application Serial No. PCT/US2008/004173, filed Mar. 31, 2008, and published on Oct. 16, 2008, as WO 2008/123959 A1, which claims the priority benefit of U.S. Provisional Patent Application Ser. No. 60/910,078 filed Apr. 4, 2007 and entitled "DIGITALLY SIGNED VOLUME MANAGEMENT IN A WAGERING GAME MACHINE", the contents of which are incorporated herein by reference in their entirety.

FIELD OF THE INVENTION

The invention relates generally to managing data in a wagering game machine environment, and more specifically to managing digitally signed volumes in a wagering game machine.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, 2008 WMS Gaming, Inc.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games do not rely on the dealer or other game players to facilitate game play and to provide an entertaining game playing environment, but rely upon the presentation of the game and environment generated by the wagering game machine itself. Incorporation of audio and video features into wagering games to present the wagering game, to provide help, and to enhance the environment presented are therefore important elements in the attractiveness and commercial success of a computerized wagering game system. It is not uncommon for audio voices to provide instruction and help, and to provide commentary on the wagering game being played. A variety of complex graphics and video capabilities are also often provided via one or more specialized graphics processors, including the ability to decode and render full motion video, and to render complex three-dimensional graphics.

Modern wagering game systems also typically employ a network connection enabling each wagering game machine to communicate with other computerized systems on the network. For example, a progressive area slot controller will coordinate the progressive slot jackpot and coordinate selection of a winner by communicating with each wagering game machine that is a part of the progressive jackpot pool. Computers are used for other purposes, such as for accounting, for tracking rates of game play, and for receiving service requests or malfunction notification. The wagering game machine can be the recipient of information, such as where configuration information like an audio volume level is sent or specified via the network connection. Software updates such as new multimedia files, new game code, operating system changes, and other such data can also be sent via the network connection to a wagering game machine.

The wagering game itself is sometimes conducted on the wagering game machine, and is sometimes conducted on a remote server which exchanges game play data with the wagering game machine. Because significant amounts of money are being wagered on the wagering game machines, security and authenticity of data stored on the wagering game machine, such as program code, and of data communicated over the network, such as accounting information or game play results, is therefore important to ensure integrity of the wagering game experience. A cheat who is able to intercept or falsify messages on the network could conceivably change the operation or configuration of wagering game machines, as well as interfere with accounting for specific wagering game machines or progressive slot machine controllers. Similarly, a cheat who is able to change the program code on a wagering game machine may be able to change the odds of a wagering game or falsify game wins.

It is therefore desirable to ensure security and authenticity of data used in presenting a wagering game on a wagering game machine.

SUMMARY

One example embodiment of the invention comprises a computerized wagering game system including a gaming module comprising gaming code which is operable when executed on to conduct a wagering game on which monetary value can be wagered. The wagering game system also comprises an authentication module operable to authenticate one or more used partitions of a nonvolatile storage volume using a first authentication method and operable to authenticate one or more unused sections of the nonvolatile storage volume using a second authentication method.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention comprises a computerized wagering game system including a gaming module comprising gaming code which is operable when executed on to conduct a wagering game on which monetary value can be wagered. The wagering game system also comprises an authentication module operable to authenticate one or more used partitions of a nonvolatile storage volume using a first authentication method and operable to authenticate one or more unused sections of the nonvolatile storage volume using a second authentication method. In some embodiments, this enables use of a variety of different storage volume sizes while keeping the used space and the used space's authentication data the same, and enables faster authentication of the unused space on the nonvolatile storage volume.

Figure 1:
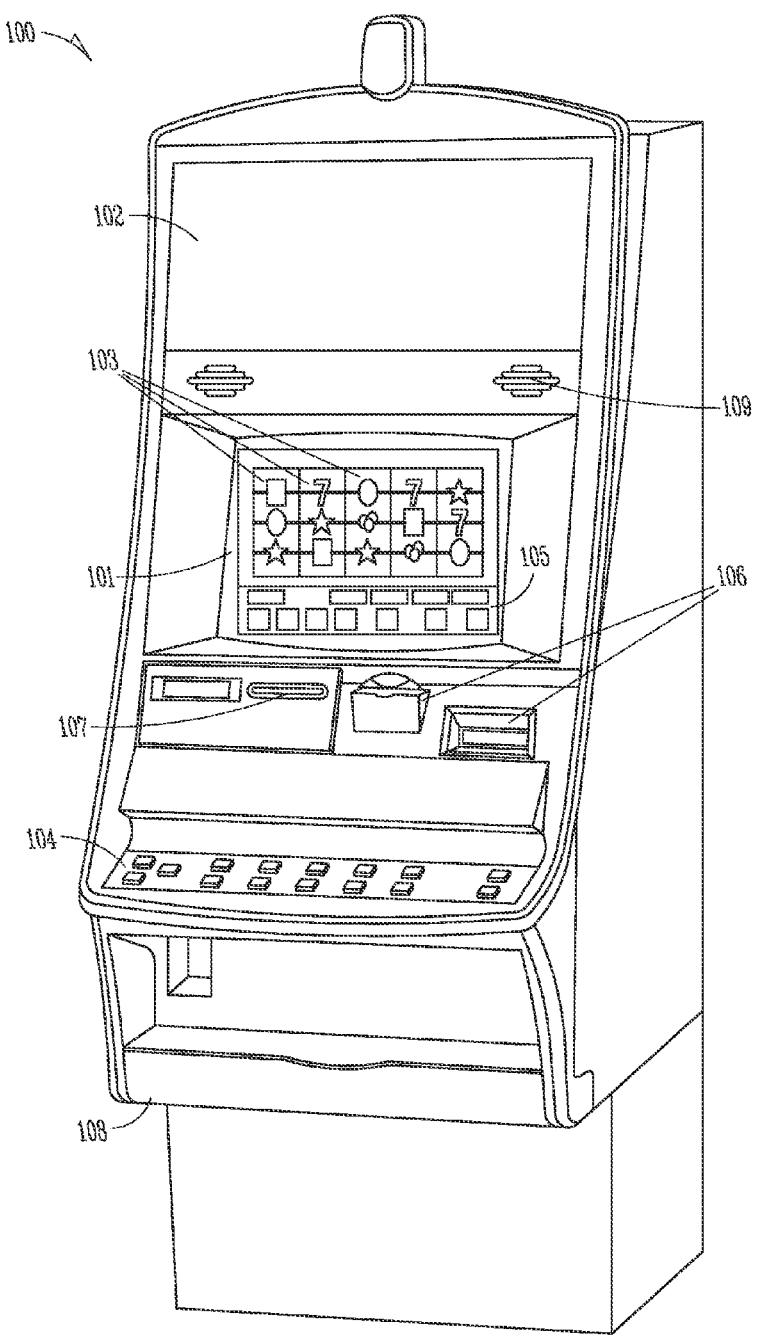
FIG. 1 shows a computerized wagering game machine, as may be used to practice some example embodiments of the invention.

FIG. 1 illustrates a computerized wagering game machine, as may be used to practice some embodiments of the present invention. The computerized gaming system shown generally at 100 is a video wagering game system, which displays information for at least one wagering game upon which monetary value can be wagered on video display 101. Video display 101 is in various embodiments a CRT display, a plasma display, an LCD display, a surface conducting electron emitter display, or any other type of display suitable for displaying electronically provided display information. Alternate embodiments of the invention will have other game indicators, such as mechanical reels instead of the video graphics reels shown at 102 that comprise a part of a video slot machine wagering game.

A wagering game is presented using software within the wagering game machine, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The game of chance implemented via the loaded software takes various forms in different wagering game machines, including such well-known wagering games as reel slots, video poker, blackjack, craps, roulette, or hold >em games. The wagering game is played and controlled with inputs such as various buttons 103 or via a touchscreen overlay to video screen 101. In some alternate examples, other devices such as pull arm 104 used to initiate reel spin in this reel slot machine example are employed to provide other input interfaces to the game player.

Monetary value is typically wagered on the outcome of the games, such as with tokens, coins, bills, or cards that hold monetary value. The wagered value is conveyed to the machine through a changer 105 or a secure user identification module interface 106, and winnings are returned via the returned value card or through the coin tray 107. Sound is also provided through speakers 108, typically including audio indicators of game play, such as reel spins, credit bang-ups, and environmental or other sound effects or music to provide entertainment consistent with a theme of the computerized wagering game. In some further embodiments, the wagering game machine is coupled to a network, and is operable to use its network connection to receive wagering game data, track players and monetary value associated with a player, and to perform other such functions.

Figure 2:
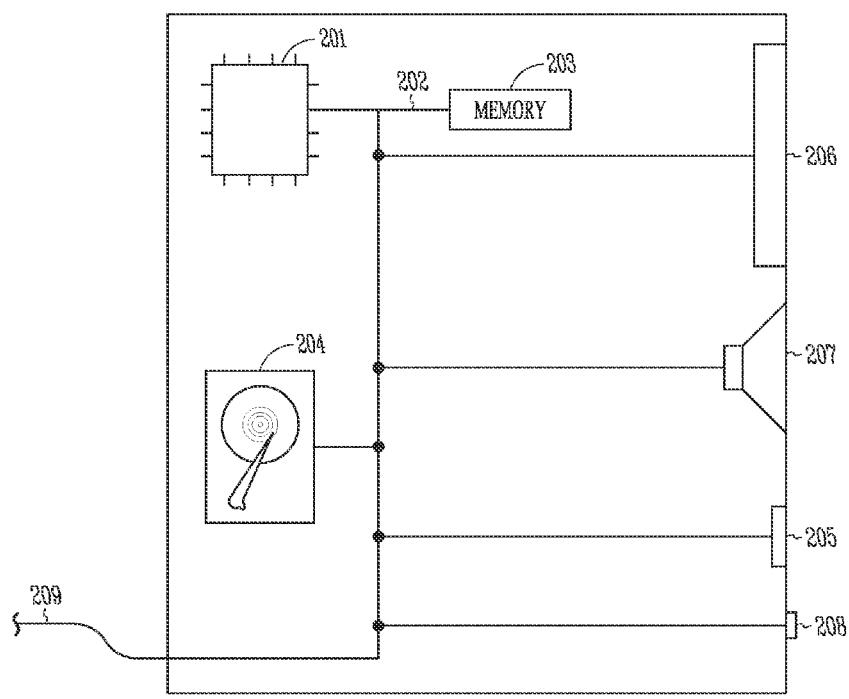
FIG. 2 is a block diagram of a wagering game system, consistent with some example embodiments of the invention.

FIG. 2 shows a block diagram of an example embodiment of a wagering game system. The wagering game system includes a processor 201, which is sometimes called a microprocessor, controller, or central processing unit (CPU). In some embodiments, more than one processor is present, or different types of processors are present in the wagering game system, such as using multiple processors to run gaming code, or using dedicated processors for audio, graphics, security, or other functions. The processor is coupled via a bus 202 to various other components, including memory 203 and nonvolatile storage 204. The nonvolatile storage is able to retain the data stored therein when power is removed, and in various embodiments takes the form of a hard disk drive, nonvolatile random access memory such as a compact flash card, or network-coupled storage. Further embodiments include additional data storage technologies, such as compact disc, DVD, or HD-DVD storage in the wagering game system.

The bus 202 also couples the processor and components to various other components, such as a value acceptor 205, which is in some embodiments a token acceptor, a card reader, or a biometric or wireless player identification reader. A touchscreen display 206 and speakers 207 serve to provide an interface between the wagering game system and a wagering game player, as do various other components such as buttons 208, pullarms, and joysticks. A network connection 209 couples the wagering game system to other wagering game machines and to a wagering gape server, such as to provide downloadable games or to provide accounting, player tracking, or other functions. These components are located in a wagering game machine cabinet such as that of FIG. 1 in some embodiments, but can be located in multiple enclosures comprising a wagering game system or outside a wagering game machine cabinet in other embodiments, or in alternate forms such as a wireless or mobile device.

In operation, the wagering game system loads program code from nonvolatile storage 204 into memory 203, and the processor 201 executes the program code to cause the wagering game system to perform desired functions such as to present a wagering game upon which monetary value can be wagered. This and other functions are provided by various modules in the computerized system such as an audio module, a game presentation module, or a touchscreen display module, where such modules comprise in some embodiments hardware, software, mechanical elements, manual intervention, and various combinations thereof. The wagering game machine is coupled to other wagering game machines, and to various other elements such as game servers, accounting servers, or community or progressive game servers via the network connection 209, and exchanges data with these machines via the network connection.

The nonvolatile storage 204 is in some embodiments a hard disk drive, flash memory, or another nonvolatile storage device or group of devices having one or more partitions. In one example, a single hard drive is split into three separate partitions, each of which is addressable and can be managed as though it were a separate storage device. In another example, a nonvolatile flash memory comprises a single partition, or a hard disk drive comprises a single partition.

Multiple partitions are used in some embodiments for purposes including using different partitions to store operating system code, wagering game code, multimedia information, and downloaded information such as downloadable games. Further, some operating systems such as Linux can benefit from using a separate partition or separate nonvolatile storage device for virtual memory, by which a computerized wagering game machine can store "pages" of information not currently being used in memory in nonvolatile storage such as on a hard disk drive, freeing up main memory for other data. Although main memory is significantly faster than hard disk or most other nonvolatile storage, the cost for main memory is typically significantly higher than for nonvolatile storage, making memory sizes in a typical computerized wagering game system much smaller than the size of nonvolatile storage available. Many operating systems therefore use swap files, such that pages of memory can be swapped between the swap file and memory based on the need to have certain pages in memory at any given time. Using such a virtual memory scheme, the computer hardware and operating system can operate as though the wagering game system has significantly more addressable main memory than is physically installed.

In other examples, one or more partitions are used to store the operating system, wagering game code, and other data that should be kept secure to ensure fair and reliable operation of the wagering game, while other partitions store less sensitive data such as sound and graphics files, or store downloaded game code not yet verified and installed onto a secure partition for execution.

Figure 3:
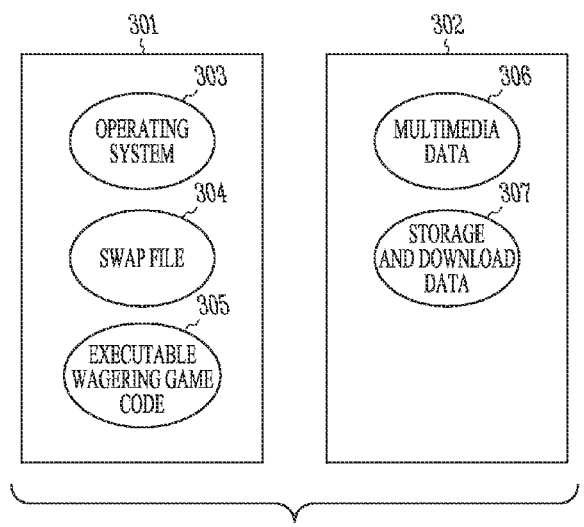
FIG. 3 is a block diagram illustrating multiple storage volumes having multiple partitions in a wagering game machine, as may be used to practice some embodiments of the invention.

FIG. 3 shows a more detailed example of a wagering game machine having multiple storage volumes with multiple partitions. Although this example shows nonvolatile storage devices each having multiple partitions, other embodiments of the invention will have one or more hard disk drives or other nonvolatile storage devices having a single partition on the storage device. In this example, nonvolatile storage volumes 301 and 302 are coupled to the wagering game system via the wagering game system's bus, such as where the storage volumes comprise hard disk drives coupled to the computerized system through a storage device adapter such as a SCSI (Small Computer system Interface) interface card or an ATA (Advanced Technology Attachment) or SATA (Serial ATA) adapter residing between the bus and the hard disk drives. In this example, the hard disk drive 301 contains the operating system 303 that contains the operating system code used to boot and run the computerized wagering game system, and a swap file 304 that is used to store the swap file used by the operating system's virtual memory system. The disk drive 301 also contains executable wagering game code 305, which is executed to present the wagering game to a game player. The second hard disk drive 302 contains multimedia data 306 and writable storage and download data 307. In some embodiments, each of the data groups 303-307 shown in the storage volumes 301 and 302 are stored in different partitions, such as on a partitioned hard disk drive or other nonvolatile storage such as a compact flash drive.

In operation, the computerized wagering game machine starts up and verifies the contents of the storage volume 301, such as by calculating a hash value of volume's data or confirming a digital signature of the data stored on the disk drive. In this example, only the operating system and program data stored on hard disk drive 301 is verified, as the swap file is typically not retained during a reboot and the multimedia and other data on disk drive 302 does not need to be verified. The wagering game system then boots from the operating system 303, which creates and uses the swap file 304 for the operating system's paged memory swap file. In this example, the swap file is given its own partition in part to prevent fragmentation of the swap file, which can lead to increased read/write times and reduced virtual memory performance. Once the operating system is loaded, wagering game code is executed from hard disk drive 301's executable wagering game code 305, to present a wagering game upon which monetary value can be wagered.

The storage volume 302's writable storage/download partition 307 of this example is used to download and store new games, and to store other data that is not directly executed. The hard disk drive 302, or one or more partitions on the hard drive storing this non-critical data, is restricted such that data can be read from the partition and written to the partition, but code cannot be run from the partition. The hard disk drive 302 is used in this example to store downloaded game code images as part of the downloaded data 307, and the downloaded game code is verified such as by using digital signature methods or other authentication or encryption methods before being written to the executable wagering game partition 305 for execution of the downloaded wagering game. The storage volume 302 is also used in some embodiments to store multimedia or other nonexecutable information 306, such as to store audio and video files, pictures, and other data that takes a significant amount of storage space but that is not executable and cannot affect other game or operating system code or the operation of the wagering game system.

The storage volumes and partitions can take various forms, including a partition designated as "active", from which the computerized wagering game system boots, hidden partitions that aren't visible once the operating system has booted, and normal partitions that are visible but aren't designated as the boot source. Most partitions or blocks of unpartitioned space on a nonvolatile storage volume can be classified into a few major types of partition, including FAT (file allocation table) and its variants such as FAT32 that were traditionally used by DOS and earlier versions of Microsoft Windows, Linux's EXT2 and EXT3 file systems, Linux's swap file partition, NTFS (New Technology File System) as is typically used by newer versions of Microsoft Windows, unallocated space that has not been assigned to a partition, and unformatted space that belongs to a partition but that has not been formatted for data storage.

Further, partitions are traditionally identified in the Master Boot Record, or MBR of a hard disk drive or other nonvolatile storage device, which includes space to record information for up to four partitions. Because more than four partitions are sometimes desired, partitions identified as logical partitions can be created such that logical partitions aren't required to take one of the four spots in the master boot record. The four partitions identified in the master boot record can therefore be either primary or logical partitions, but because of the limitations of the master boot record, any partitions beyond four primary partitions must be logical partitions. Further, the partition identified as active must be a primary partition and not a logical partition in some embodiments for the active partition to be bootable.

To ensure the security of a wagering game system, the storage volumes and partitions are subject to various security restrictions in some embodiments. In one example, the operating system partition is verified by the basic input output system (BIOS), preboot execution environment (PXE) boot extension, or other mechanism, such as by comparing the hash value of the operating system to a known valid hash value, or by comparing a digital signature of the operating system or a digital signature of a hash of the operating system to a known valid digital signature. In one more detailed example, a hash value of the operating system partition is digitally signed and provided to the wagering game system, which can verify the digital signature and hash value.

The operating system similarly examines the executable wagering game code for a digital signature, verifying that the wagering game code is authentic and has not been tampered with such as by using a digitally signed hash of the wagering game code partition. The operating system data 303 and the executable wagering game code data 305 are in a further embodiment write protected, such that the contents of the partitions cannot be written other than by authorized applications or operating system processes. This enables secure download and installation of new wagering games in some embodiments, using a "scratch" or writable storage partition such as 307 of FIG. 3.

Verification of the partition or volume information for the boot volume 301 relies in some embodiments on cryptographic technology such as digital signatures or certificates. Cryptographic or encryption technologies typically utilize a symmetric or asymmetric algorithm, designed to obscure the data such that a specific key is needed to read or alter the data. A symmetric algorithm relies on agreement of a secret key before encryption, and the decryption key is either the same as or can be derived from the encryption key. Secrecy of the key or keys is vital to ensuring secrecy of the data in such systems, and the key must be securely distributed to the receivers before decryption such as via a secure key exchange protocol. Common symmetric algorithms include DES, 3DES or triple-DES, AES, Blowfish, Twofish, IDEA, RD2, RC4, and RC5.

Public key algorithms, or asymmetric algorithms, are designed so that the decryption key is different than and not easily derivable from the encryption key. The term "public key" is used because the encryption key can be made public without compromising the security of data encrypted with the encryption key. Anyone can therefore use the public key to encrypt a message, but only a receiver with the corresponding decryption key can decrypt the encoded data. The encryption key is often called the public key, and the decryption key is often called the private key in such systems.

Such systems can be used to digitally sign a document where the signer uses the secret private key to encrypt the document or some portion of it such as a one-way hash of the document, and then publishes the encrypted message. Anyone can use the signer's published or known public key to decrypt the signed message, confirming that it was encrypted or signed by the owner of the public/private key pair. In some examples, the publisher of a wagering game executable, an operating system, or other partition contents digitally signs the contents of the partition such that the partition can be verified by decrypting the partition or a signed hash of the partition with a known and trusted public key. Common public key algorithms include RSA, Diffie-Hellman, elliptic curve cryptography, and ElGamal.

One-way hash functions take an input string and derive a fixed length hash value. The hash value is typically of significantly shorter length than the document, and is often calculated by application of some type of data compression algorithm. The functions are designed so that it is extremely difficult to produce an input string that produces a certain hash value, resulting in a function that is considered one-way. Data can therefore be checked for authenticity by verifying that the hash value resulting from a given one-way hash function is what is expected, making authentication of data relatively certain. Hash functions can be combined with other methods of encryption or addition of secret strings of text in the input string to ensure that only the intended parties can encrypt or verify data using the one-way hash functions. Common examples of one-way hash function encryption include MD2, MDC2, MD4, MD5, and SHA.

A variation on one-way hash functions is use of Message Authentication Codes, or MAC. A MAC comprises a one-way hash function that further includes a secret key, such that knowledge of the key is necessary to encode or verify a given set of data. MACs are particularly useful where the hash value would otherwise be subject to unauthorized alteration or replacement, such as when transmitted over a public network or a network that would be difficult to protect, such as a very large network linking hundreds of computerized wagering game machines in a large gaming facility.

Digital signature algorithms such as DSA, ECDSA, ElGamal and RSA digital signature algorithms make use of various symmetric or asymmetric encryption technologies, sometimes including hash or message authentication code technologies, to enable a user to sign data such as by encrypting a hash of the document with a private key so that the public key can be used to confirm authenticity of the data.

But, application of verification technologies such as digital signatures and hash value calculations are time consuming, and have a significant impact on the startup time of a wagering game machine. Further, some regulations require that the entire volume on which a secure partition is stored must be verified, such that a relatively small wagering game partition and operating system partition on a large storage volume can take much longer to verify that it would take to verify just the partitions.

These and other problems are addressed in various embodiments of the invention, which seek to handle unused space on a storage volume differently than used space, in an effort to save time in verifying a nonvolatile storage volume. In one example, hash values are always computed for the same size usable space on a volume, whether the actual volume size is smaller or larger than the defined volume size. This method enables use of storage volumes of different sizes by use of virtual sectors to fill the defined volume size or by disabling unneeded sectors of storage volumes of varying sizes, making the apparent volume size and calculated hash value the same across a variety of physical volume configurations.

In another example, a separate hash value is computed for the portion of the volume used to store data and a separate hash value is calculated for the unused portion of the volume. The hash value for the unused portion of the volume can in some embodiments be calculated in the background after the wagering game machine has begun to boot or is operational, depending on applicable regulations.

In a third example, a digital signature or hash value is calculated for the used partition space on a storage volume, and the remainder of the space on the volume is verified not to contain executable code such as by filling the space with a zero value and verifying the unused space contains all zeros. Verifying unused space filled with a known value such as all zeros is significantly faster than calculating a hash value or digital signature value for the same space, and can in some embodiments be done in the background after a machine has begun the boot process or is actively presenting a wagering game.

Figure 4:
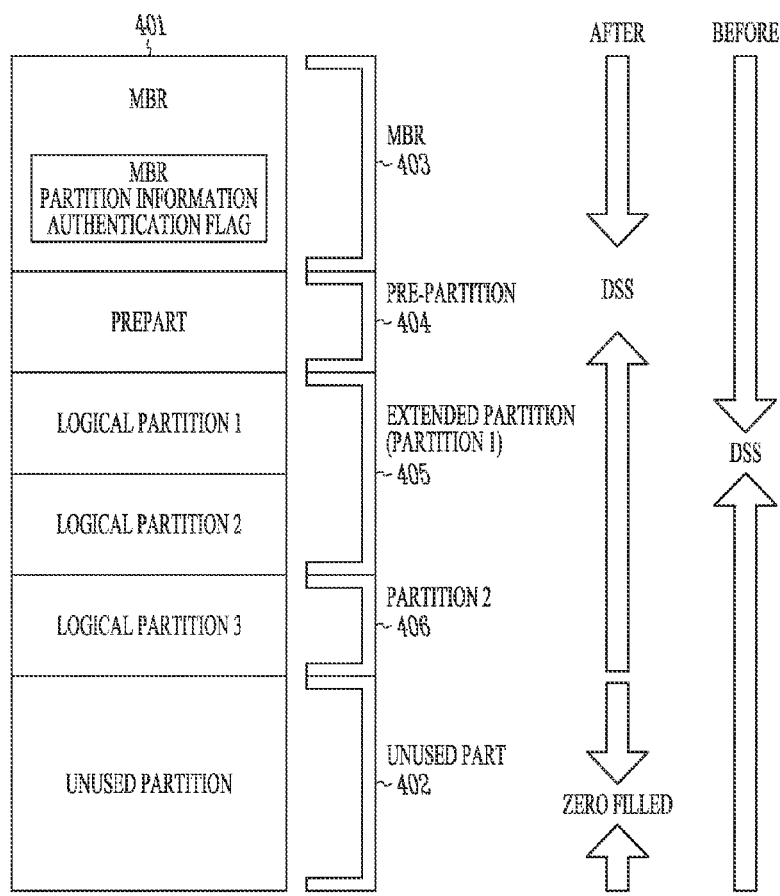
FIG. 4 is a block diagram of an operating system nonvolatile storage volume, consistent with some example embodiments of the invention.

In one example embodiment illustrated in FIG. 4, a compact flash drive 401 includes a variety of areas used for operating system functions, and an unused area 402. The first used section of the compact flash storage volume comprises a master boot record 403, sometimes simply referred to as an MBR. The MBR contains partition information, defining the locations of the various partitions on the compact flash drive. In this example, the master boot record is validated by the computerized system upon boot, such as by use of a pre-boot execution environment (PXE boot) validation process. Other digital signature information is stored in the pre-partition 404, including a digital signature for the entire signed region of the flash drive, a digital signature for the pre-partition 404 itself, a digital signature for the first and second logical partitions 405, and a signature for the third logical partition 406.

The prepartition includes a copy of the master boot record, a file signature table, and a variety of digital signatures, such that any change in the master boot record or the prepartition would be evident in both the boot sequence master boot record and pre-partition check as well as the pre-partition digital signature and the digital signature for the entire used region of the compact flash drive 401. Any change to the master boot record or file signature tables would therefore result in failure of at least one digital signature verification process.

The unused partition 402 can in this example be of any size, and may be a very small part of the total volume size or may be a significant portion of the volume size, without affecting the digital signatures calculated and stored for verification of the partitions 403-406. This is possible because the size of these partitions no longer varies with the volume size, as excess space simply becomes a part of the unused space whatever its size.

The unused space is checked for content, such as by verifying that a certain pattern such as all zeros or all ones fills the space. This is computationally much simpler than calculation of a digital signature or hash value, and results in relatively fast checking of the zero-filled space. This enables wagering game machines to use storage volumes significantly larger than are needed to store used partitions 403-406 without incurring a significant and unnecessary delay in boot time. Further, checking the unused space 402 is in some examples performed after the machine has booted and is operational, enabling even more rapid boot and verification of the wagering game machine.

Figure 5:
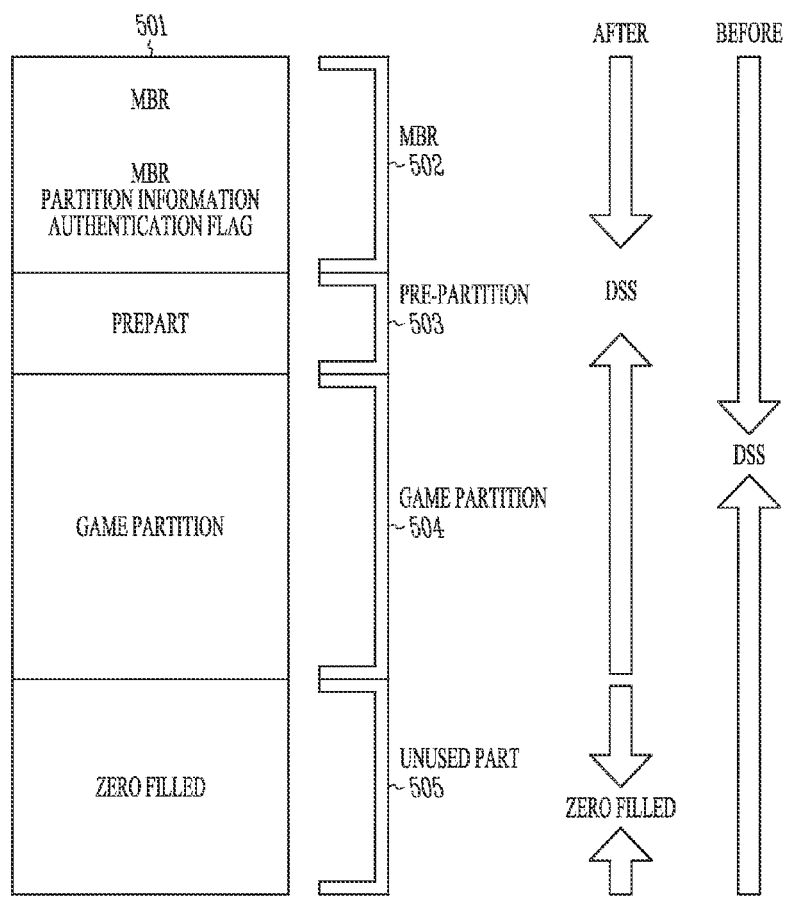
FIG. 5 is a block diagram of a wagering game code nonvolatile storage volume, consistent with some example embodiments of the invention.

FIG. 5 similarly illustrates how a separate game compact flash volume 501 in the same wagering game machine also includes unused space verified using an alternate method. A pre-partition 503 and a game partition 504 store pre-partition information such as was described in FIG. 4 and game code, while the remainder of the volume comprises unused space 505.

Figure 6:
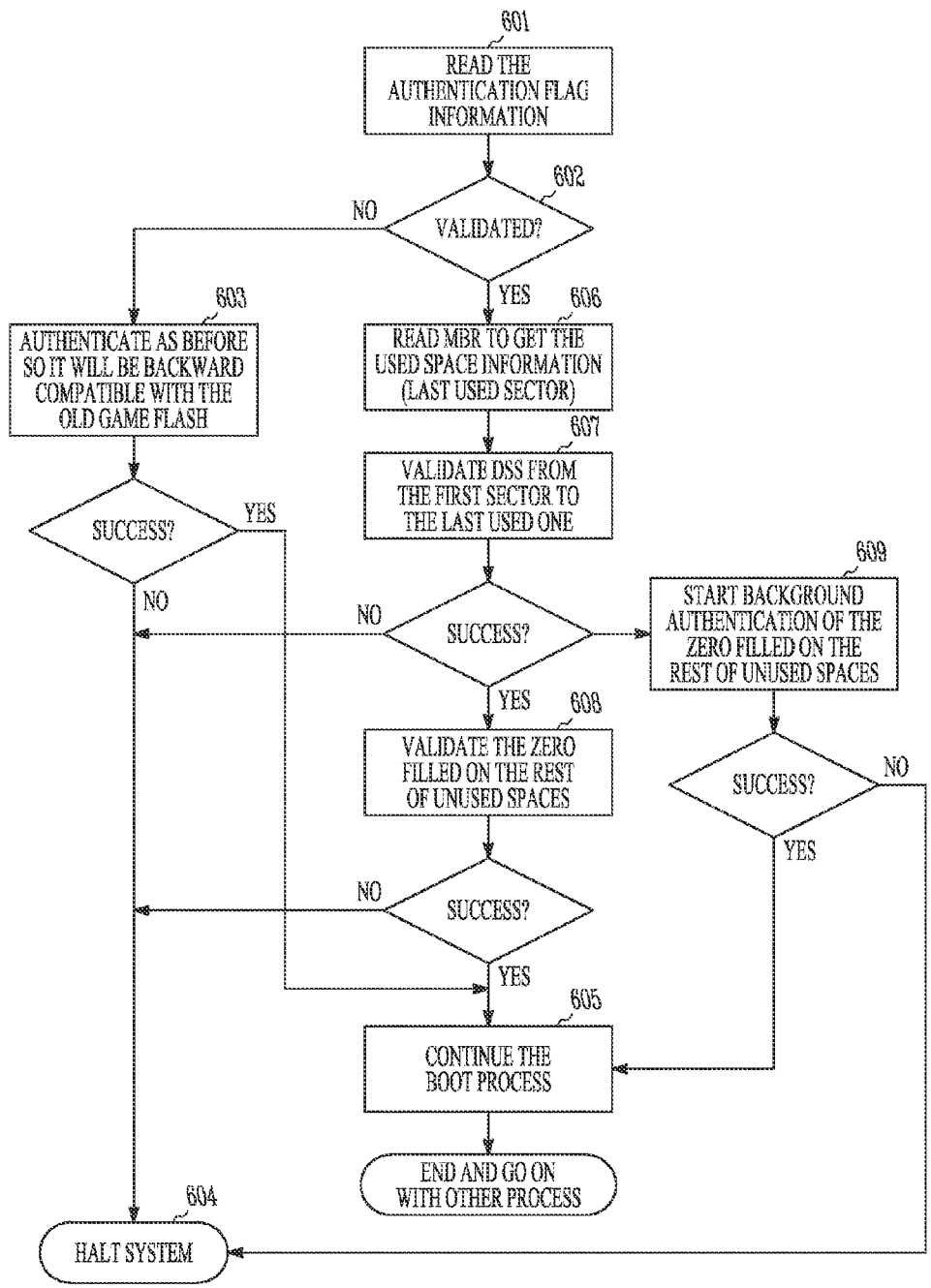
FIG. 6 is a flowchart of a method of authenticating used and unused space in a wagering game machine nonvolatile storage volume, consistent with some example embodiments of the invention.

The volume authentication process used in this example is illustrated in a flowchart shown in FIG. 6. At 601, authentication flag information is read if present, indicating that unused space on the volume being authenticated is to be checked using an alternate method for unused space. If such a flag is determined not present at 602, the traditional authentication process is run on the entire volume at 603. If validation fails, the system is halted at 604, and if validation succeeds, the boot process continues at 605.

If the authentication flag information indicates there is free space to be authenticated using a second authentication process at 602, the master boot record is read at 606 to determine what space is used and what space is unused. The used space is authenticated using a digital signature technique at 607, and if determined successful, the unused space is checked for the presence of undesired code at 608. In an alternate embodiment, checking the unused space occurs in the background after the wagering game system has booted and is operational as illustrated at 609. If the unused space is empty as intended, the boot process continues at 605, while if the unused space contains unexpected data the system is halted at 604.

The method used to authenticate the unused space comprises confirming that the unused space is filled with all zeros in the above example, but takes other forms in other embodiments. In a related example, compare instructions are used to compare another reference bit, a reference byte of 8 bits, or a reference word of any number of bits to the data stored in memory. In a 32-bit processor, for example, a compare instruction may compare a 32-bit word to each 32-bit data location in nonvolatile storage in each operation, thereby verifying 32 bits at a time. The actual word value need not be all zeros, but could just as readily be all ones, alternating ones and zeros, or any other pattern of values. In still further embodiments, other authentication methods such as use of hash values or digital signatures may be employed, including modified or less robust variations of the verification algorithms employed for the used portions of the storage volume.

Some embodiments described above have the advantage of enabling a digital signature or other verifying information derived for a certain partition or segment of a storage volume to be used with storage volumes of different sizes than the one originally used in computing the verifying information. Using prior methods, a digital signature of a typical volume is dependent both on the contents of the volume and on the size of the volume. Adding unused or unfilled space to the volume changes the digital signature value, making the digital signature unusable. Using some embodiments of the invention, the digital signature for the used portion of the volume remains the same irrespective of the volume size, and the unused portion of the volume is verified using other methods such as a second digital signature or by checking that the unused space is unfilled or does not contain executable code. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof

The invention claimed is:

1. A method of authenticating nonvolatile storage in a wagering game machine, comprising:
   authenticating, with use of the wagering game machine, a used portion of the nonvolatile storage using a first authentication method, wherein the first authentication method includes verifying the used portion of the nonvolatile storage using a cryptographic hash function; and authenticating, with use of the wagering game machine, an unused portion of the nonvolatile storage using a second authentication method distinct from the first authentication method, wherein the second authentication method includes verifying a predetermined pattern existing throughout the unused portion of the nonvolatile storage.

2. The method of authenticating nonvolatile storage in a wagering game machine of claim 1, wherein authenticating the used portion of the nonvolatile storage comprises verifying a hash value of the used portion.

3. The method of authenticating nonvolatile storage in a wagering game machine of claim 1, wherein authenticating the used portion of the nonvolatile storage comprises verifying a digital signature of the used portion.

4. The method of authenticating nonvolatile storage in a wagering game machine of claim 1, wherein a size of the used portion of the nonvolatile storage remains constant across different nonvolatile storage volume sizes, and a size of the unused portion varies across different nonvolatile storage volume sizes.

5. The method of authenticating nonvolatile storage in a wagering game machine of claim 4, wherein at least one of a hash value and a digital signature of the used portion of the nonvolatile storage remains constant across different nonvolatile storage volume sizes.

6. The method of authenticating nonvolatile storage in a wagering game machine of claim 1, further comprising presenting a wagering game upon which monetary value can be wagered.

7. The method of claim 6, wherein authenticating the unused portion of the nonvolatile storage is initiated after initiating the presentation of the wagering game.

8. The method of claim 1, wherein the second authentication method includes verifying a uniform predetermined pattern existing throughout the unused portion of the nonvolatile storage by comparing a predefined key to at least one of a digital signature or a hash value of the unused portion.

9. A machine-readable storage medium with instructions stored thereon, the instructions when executed by a computerized wagering game system being operable to cause the computerized wagering game system to:
 authenticate one or more used partitions of a nonvolatile storage volume using a first authentication method, wherein the first authentication method includes verifying the used partitions of the nonvolatile storage volume using a cryptographic hash function; and
 authenticate one or more unused sections of the nonvolatile storage volume using a second authentication method distinct from the first authentication method, wherein the second authentication method includes verifying a predetermined pattern existing throughout the unused sections of the nonvolatile storage volume.

10. The machine-readable medium of claim 9, wherein the one or more unused sections of the nonvolatile storage volume comprise at least one of unpartitioned space, an empty partition, and an unformatted partition.

11. The machine-readable medium of claim 9, wherein the first cryptographic authentication method comprises at least one of a digital signature or a hash value.

12. The machine-readable medium of claim 9, wherein the size of the one or more used partitions of the nonvolatile storage remains constant across different nonvolatile storage volume sizes, and the size of the unused section varies across different nonvolatile storage volume sizes.

13. The machine-readable medium of claim 12, wherein at least one of a hash value and a digital signature of the one or more used partitions of the nonvolatile storage volume remains constant across different nonvolatile storage volume sizes.

14. The machine-readable medium of claim 9, wherein the instruction cause the processor to initiate presentation of a wagering game upon which monetary value may be wagered prior to authenticating the unused portion of the nonvolatile storage.

15. The machine-readable medium of claim 9, wherein authenticating the one or more used portions of the nonvolatile storage includes at least one of: verifying a hash value of the one or more used portions, and verifying a digital signature of the one or more used portions.

16. A computerized wagering game system, comprising:
 a gaming module comprising gaming code which is operable to present a wagering game on which monetary value can be wagered; and
 an authentication module operable to authenticate one or more used sections of a nonvolatile storage volume using a first authentication method and to authenticate one or more unused sections of the nonvolatile storage volume using a second authentication method distinct from the first authentication method, wherein the first authentication method includes verifying the used sections of the nonvolatile storage volume using a cryptographic hash function, and wherein the second authentication method includes verifying a predetermined pattern existing throughout the unused sections of the nonvolatile storage volume.

17. The computerized wagering game system of claim 16, wherein the authentication module is configured to authenticate the one or more used sections of a nonvolatile storage volume after initiation of presentation of the wagering game by the gaming module.

18. The computerized wagering game system of claim 16, wherein the one or more unused sections of the nonvolatile storage volume comprise at least one of unpartitioned space, an empty partition, and an unformatted partition.

19. The computerized wagering game system of claim 16, wherein the first cryptographic authentication method includes at least one of: verifying a hash value of the one or more used portions, and verifying a digital signature of the one or more used portions.

* * * * *

UNITED STATES PATENT AND TRADEMARK OFFICE
CERTIFICATE OF CORRECTION

PATENT NO. : 8,317,607 B2  
APPLICATION NO. : 12/594740  
DATED : November 27, 2012  
INVENTOR(S) : Shimabukuro et al.

Page 1 of 1

It is certified that error appears in the above-identified patent and that said Letters Patent is hereby corrected as shown below:

In the Specifications:

In column 4, line 8, delete "hold >em" and insert --hold'em--, therefor

In column 4, line 57, delete "gape" and insert --game--, therefor

In column 6, line 40-41, after "partition", delete "305", therefor

In column 10, line 59, after "thereof", insert --.--, therefor

Signed and Sealed this  
Eighteenth Day of June, 2013

Teresa Stanek Rea  
*Acting Director of the United States Patent and Trademark Office*